United States Patent

Bohner et al.

[11] Patent Number: 5,823,313
[45] Date of Patent: Oct. 20, 1998

[54] PRESSURE-CONTROL DEVICE

[75] Inventors: Ulrich Bohner, Unteruhldingen; Hugo Burkhart, Ravensburg, both of Germany

[73] Assignee: ZF Friedrichshafen AG, Friedrichshafen, Germany

[21] Appl. No.: 727,446
[22] PCT Filed: Apr. 15, 1995
[86] PCT No.: PCT/EP95/01421
§ 371 Date: Oct. 18, 1996
§ 102(e) Date: Oct. 18, 1996
[87] PCT Pub. No.: WO95/29350
PCT Pub. Date: Nov. 2, 1995

[30] Foreign Application Priority Data

Apr. 22, 1994 [DE] Germany .......... 44 14 165.3

[51] Int. Cl.⁶ .......... F16H 61/06; F16D 48/06
[52] U.S. Cl. .......... 192/85 R; 192/109 F
[58] Field of Search .......... 192/3.58, 85 R, 192/109 F

[56] References Cited

U.S. PATENT DOCUMENTS

| 3,674,121 | 7/1972 | Copeland . |
| 3,882,980 | 5/1975 | Blake .......... 192/109 F X |
| 4,132,302 | 1/1979 | Chatterjea . |
| 4,478,237 | 10/1984 | Blake et al. . |
| 4,676,349 | 6/1987 | Coutant . |
| 5,251,443 | 10/1993 | Ehrlinger et al. . |

FOREIGN PATENT DOCUMENTS

| 2511095 | 8/1982 | France . |
| 2120545 | 9/1972 | Germany . |
| WO 91/02913 | 3/1991 | Germany . |
| 2106610 | 4/1983 | United Kingdom . |
| WO 84/00794 | 3/1984 | WIPO . |

Primary Examiner—Richard M. Lorence
Attorney, Agent, or Firm—Davis and Bujold

[57] ABSTRACT

A pressure-control device is used to affect the engaging behavior of powershift clutches in a powershift gear with a control valve cooperating with a damping device, as a pressure-control valve (2), by which the pressure cycle can be set on engaging the clutch concerned. The pressure in a chamber (C3), between a displacement piston (4) and a pressure-control piston (3), can be controlled via a first switching valve (11) switched by a magnetic valve (10). A chamber (C2) behind the displacement piston (4) can be exhausted, via a second switching valve (14) switched by the same magnetic valve (10), whereby the pressure-control piston (3) is held in its initial position to release the full valve aperture cross section from the pressure line (1) to the clutch line (7).

9 Claims, 1 Drawing Sheet

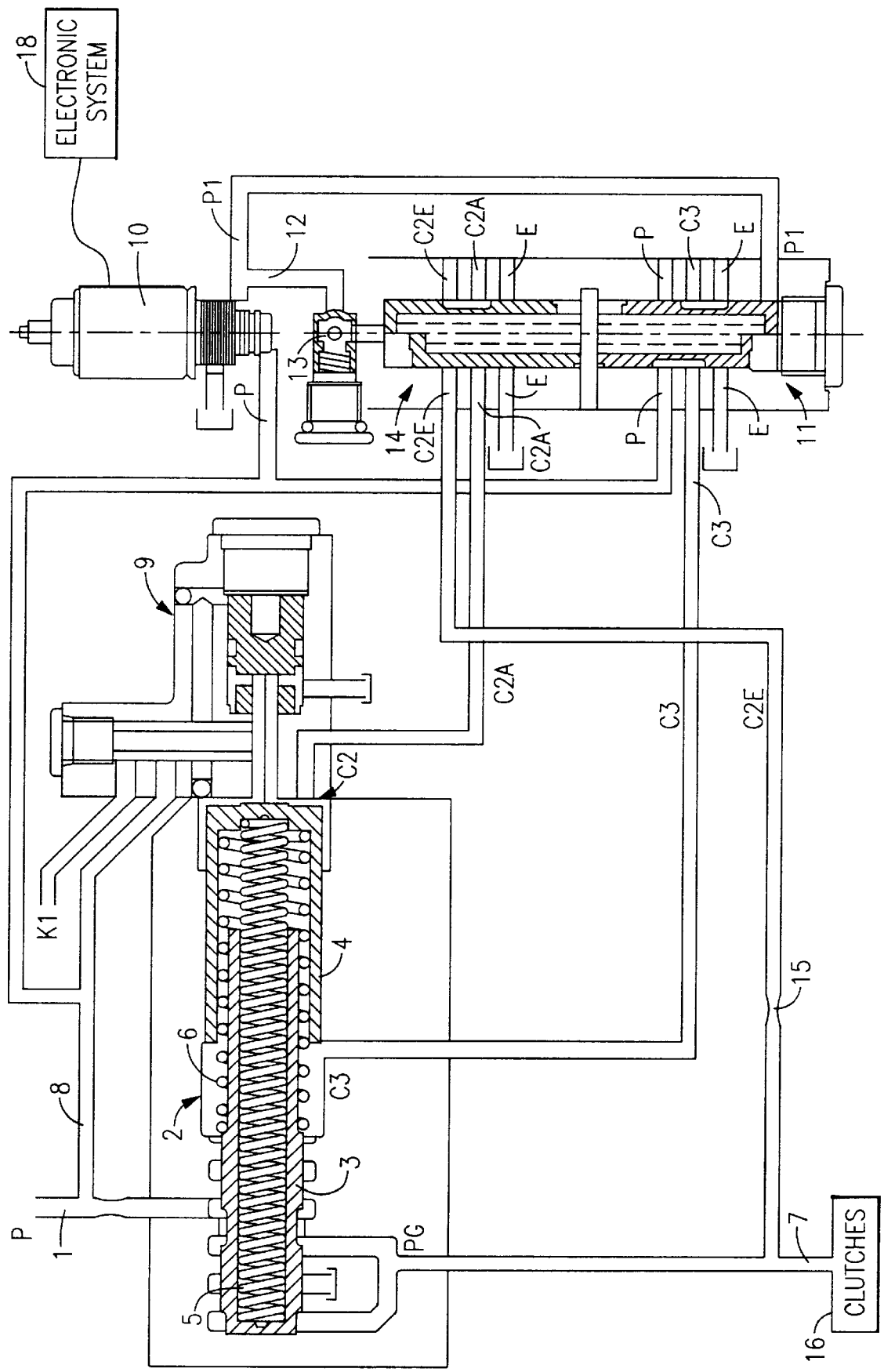

PRESSURE-CONTROL DEVICE

The invention concerns a pressure-control device to affect the engaging behavior of powershift clutches in a powershift gear with a control valve cooperating with a damping device as pressure-control valve by means of which the pressure cycle can be set upon engaging the clutch concerned.

DE 21 20 545 has disclosed a pressure-control for gearshift clutches in motor vehicles.

Hydraulic fluid is here forced into an intermediate chamber, between a hollow piston and a control piston, so that said pistons move away from each other and thus the pressure-control device can be moved back to its initial position.

However, in the pressure-control device according to DE 21 20 545, it is disadvantageous that the pressure-control device still has not been reset to its initial position when two clutches are consecutively switched during a short interval of time. The pressure control of the second clutch begins, therefore, at the point of a modulation curve at which the pressure in the pressure-control device is, at the moment of actuation of the second clutch, and not, as it would be necessary for a jolt-free switching operation, at a definite point of the modulation curve, since the whole modulation curve must be cycled through for optimal switching.

Therefore, the pressure of the second clutch is not gradually increased but leaps immediately to the pressure momentarily existing in the pressure-control device whereby a so-called impulse is produced.

Another disadvantage of the pressure-control device, disclosed in the publication cited, is the impossibility of quickly filling the clutch cylinder. Said disadvantage results from the fact that the control piston moves from its starting position where the control edge of the valve releases the full aperture cross section of the clutch cylinder to its pressure-control, where only a small throttle cross section is open on the control edge of the valve, as soon as the pressure, behind the pressure-control valve and before the line to the clutch cylinder, has reached a certain value due to the prestress force of a spring.

Said pressure value is relatively low whereby starting from said point the clutch cylinder is filled only still throttled so that the filling operation of the clutch cylinder lasts a relatively long time.

In order to obtain a good switching quality, the filling time must be as short as possible so that the power flow, in the drive train of the motor vehicle, is only briefly interrupted.

Accordingly, the problem on which this invention is based is to provide a pressure-control device which overcomes the disadvantages of the prior art, especially one that makes possible an impulse-free switching and a quick filling of the clutch cylinder.

According to the invention this problem is solved by the fact that, via a first switching valve switched by a magnetic valve, pressure can be controlled in a chamber C3 between a displacement piston and a pressure-control piston and, via a second switching valve switched by the same magnetic valve, a chamber C2 behind the displacement piston can be exhausted, the pressure-control piston being held in its initial position for releasing the full valve aperture cross section from the pressure line to the clutch line.

By the possibility of being able to control pressure in the chamber C3, between displacement piston and pressure-control piston, the displacement piston and the pressure-control piston can be very quickly again returned to their initial positions.

This quick return of the displacement piston and of the control piston, to their initial positions, is also made possible by the fact that the chamber behind the displacement piston can be exhausted so that the displacement piston does not have to be moved against any great resistance.

As result of the release of the full valve aperture cross section from the pressure line to the clutch line in the initial position of the pressure-control piston, it is possible to fill the clutch cylinder quickly.

The magnetic valve can always be advantageously activated in a neutral state and with a switched gear and the magnetic valve, after engaging a new clutch, still can remain activated for a specific time $t\_M6$ and by disengagement of the magnetic valve, via the first switching valve, the chamber C3 can be exhausted and the chamber C2 can be connected, by the second switching valve, with a line C2E which is connected via an orifice with the clutch line.

Here the magnetic valve is activated not permanently but only as long as a gear is switched or as long as the gear which is precisely being used is engaged. If a new gear should be switched, then the magnetic valve is activated for the time $t\_M6$ calculated from the beginning of the switching operation so that the adjoining pressure remains on a high pressure level to carry out the quick filling. The magnetic valve then is disengaged until the pressure modulation is terminated with certainty.

By exhausting the chamber C3, via the first switching valve, it is possible to move the displacement piston as quickly as possible from its initial position to an actuating position.

In an advantageous design of the pressure-control device, it can be provided that, between the magnetic valve and the second switching valve, a throttle recoil valve is situated which, when the magnetic valve is activated, allows the oil flow to pass from the magnetic valve to the switching valve unhindered, but when the magnetic valve is disengaged, throttles the oil flow that flows back from the switching valve to the magnetic valve.

By the throttling of the oil stream flowing back from the switching valve to the magnetic valve it is obtained that the second switching valve moves back, with a delay, to its initial or normal position while the second switching valve, when the magnetic valve is engaged, can be immediately controlled to its actuated position, since in this direction the full volume flow of the hydraulic fluid can flow unhindered via the throttle recoil valve.

The magnetic valve can be reactivated immediately in a simple manner when a new clutch is engaged during a current pressure modulation.

By virtue of the possible immediate activation of the magnetic valve when a new clutch is engaged, it is ensured that the current pressure modulation is interrupted and a new pressure modulation begins anew at a definite point which sets the initiation of the pressure-modulation curve. The impulses of the prior are hereby avoided.

A electronic control system is provided for an exact control of the magnetic valve.

The time $t\_M6$ can be advantageously variably programmed, in the array of the electronic control system, and additionally be changeable depending on the oil temperature and on the clutch speed.

As already mentioned, the $t\_M6$ time serves to carry out quick filling of the clutch cylinder.

Since said time depends on the oil temperature which affects the viscosity of the hydraulic fluid and on the clutch speed, the $t\_M6$ time is provided variable so that it can be adapted to the mentioned parameters.

The t_M6 time obviously can also be set at zero when, in extremely short time intervals, the clutch is consecutively actuated in order to prevent a clutch already (partly) filled from being filled again.

In an advantageous embodiment of the pressure-control device it can be provided that after lapse of a certain time t_reactivation, the magnetic valve is again activatable from the beginning of switching whereby the pressure-control valve can be controlled again to its initial position.

With this embodiment, no time is lost at the beginning of a new switching to return the system or the pressure-control valve to an initial position.

Herebelow is shown fundamentally, with the aid of the drawing, one embodiment of this invention.

In the FIGURE, the oil diagram of the pressure-control device, according to the invention, is shown.

A pressure line 1 leads from a pump to a pressure-control valve 2. In the interior of the pressure-control valve, a pressure-control piston 3 and a displacement piston 4 are linearly situated and coaxially movable with respect to each other. The displacement piston 4 is here designed as a hollow piston. Both the displacement piston 4 and the pressure-control piston 3 are pressed by two compression springs 5, 6, to an initial position within the pressure-control valve 2, the compression springs 5, 6 being disposed in a manner such that the pressure-control piston 3 is pressed toward the left while the displacement piston 4 is pressed toward the right by the compression spring 6.

Within the pressure-control valve 2, between the pressure-control piston 3 and the displacement piston 4, a chamber C3 is formed into which the hydraulic fluid can flow.

A clutch line 7 leads from the pressure-control valve 2 to the clutches of the transmission 16.

Before entering in the pressure-control valve 2, one line 8 branches off from the pressure line 1. One branch of the line 8 leads here into a double pressure stage valve 9 while another branch of the line 8 leads to a magnetic valve 10 and to a first switching valve 11. From the first switching valve 11, hydraulic fluid can be again conveyed into the chamber C3 in the pressure-control valve 2.

The prestress of the compression springs 5, 6 can be increased by the double pressure stage valve 9.

One line 12 leads from the magnetic valve 10 to a throttle recoil valve 13. The throttle recoil valve 13 is directly connected with a second switching valve 14 by a line P2.

Both the first switching valve 11 and the second switching valve 14 are designed as so-called sliding valves.

One line C2E branches off from the clutch line 7 to the second switching valve 14. Another line C2A connects the second switching valve 14 with the pressure-control valve 2, more precisely with a (second) chamber C2 behind the displacement piston 4.

The magnetic valve 10 is controlled by an electronic system 18. If the electronic system is engaged, that is, supplied with the operating voltage, it immediately activates the magnetic valve 10. The output line P1 is then connected in the magnetic valve with the pressure supply P (line 8). Hereby the hydraulic fluid can flow with a pressure p from the pressure line 1, via the line 8, and through the magnetic valve 10 through a line P1 to the first switching valve 11 and via a line 12 through the throttle recoil valve 13 to the second switching valve 14 whereby both the first switching valve 11 and the second switching valve 14 are actuated.

When actuating the first switching valve 11, the hydraulic fluid loaded with a pressure p can flow in the chamber C3 of the pressure-control valve 2. Due to the rising pressure in the chamber C3, both the pressure-control piston 3 and the displacement piston 4 are moved linearly away from each other. Both the pressure-control piston 3 and the displacement piston 4 are now against their left or right stop in the pressure-control valve 2.

The pressure-control piston 3 releases, in this position, the full flow cross section on the pressure-control valve 2 between the pressure p, which can also be designated as system pressure, in the pressure line 1 and a controlled pressure p_g in the clutch line 7 so that oil with system pressure can flow into the clutches and thus a quick filling of the clutches is carried out.

In order that the displacement piston 4 can be moved, as quickly as possible, to its right stop position when pressure has built up in the chamber C3 in the pressure-control valve 2, the chamber behind the displacement piston 4 is exhausted via the line C2A. This pressure release results from the actuation of the second switching valve 14 by the magnetic valve 10.

The magnetic valve 10 remains activated for a specific, preset time t_M6. During this time the flow cross section between the pressure line 1 and the clutch line 7 remains completely open. The clutch is here filled with a maximum pressure and a maximum amount of oil.

The time t_M6, at the same time, is adjusted so that, on one hand, a complete filling of the clutch cylinder is ensured and, on the other, no torque buildup can occur during filling of the clutch cylinder. Therefore, the value of the time t_M6 depends on the size of the clutch, on the temperature of the hydraulic fluid and on the speed of the power train of the driving mechanism of the vehicle.

Once the time t_M6 has elapsed, the magnetic valve 10 becomes disengaged. The first switching valve 11 reverts here to its original position, which in the figure is shown by the right half of the piston of the first switching valve 11.

The line C3 between the expanding valve 2 and the first switching valve 11 is here connected with a vent line E which leads to the tank of the hydraulic fluid.

If the magnetic valve 10 is closed, then the pressure in the line P1 between the magnetic valve 10 and the first switching valve 11 also diminishes slowly. The actuation pressure in the line P2, between the throttle recoil valve 13 and the second switching valve 14, simultaneously also begins to diminish. The oil flows slowly through the throttle of the throttle recoil valve 13. As result of the oil flow, limited by the throttle of the throttle recoil valve 13, the second switching valve 14 returns to its original position with a time delay compared to the first switching valve 11 (see the right half of the piston of the second switching valve 14 in the FIGURE). The value of the time delay, in this embodiment, amounts to approximately 0.1 second and is designated as a so-called filling compensation time. Hereby is ensured that the clutch cylinder is filled orderly and the pressure of the hydraulic fluid is on the level of the initial pressure of the modulation before oil flows, via the line C2A, and thus the modulated pressure increase begins.

At the beginning of the modulated pressure increase, the pressure-control piston 3 moves to the right and here almost closes the flow cross section between the pressure line 1 and the clutch line 7. In the clutch line 7, a pressure p_g corresponding to the compression of the compression springs 5, 6 adjusts itself. The oil flow through the line C2E and an orifice 15 situated in the line C2E, the same as through the second switching valve 14, moves the displacement piston 4 in the pressure-control valve 2 to the left whereby the compression springs 5, 6 are pressed together which results in the pressure p_g rising linearly with the travel of the displacement piston.

At the end of its linear movement, the displacement piston 4 strikes against the pressure-control piston 3 and pushes it to its left stop within the pressure-control valve 2 so that the pressure p_g immediately rises to the system pressure p, since now the full valve aperture cross section between the pressure line 1 and the clutch line 7 has been released from the pressure-control piston 3.

After expiration of a previously adjusted reactivation time t_reactivation, the magnetic valve 10 is again actuated, the line C2A being exhausted, as described, and the chamber C3 in the control valve 2 between the pressure-control piston 3 and the displacement piston 4 being again loaded with system pressure p. The displacement piston 4 is thereby returned to its right stop.

The whole pressure-control device is thus set back to its initial position for another filling of the clutch.

The time t_reactivation is somewhat longer than the normal modulation time which amounts to approximately 1.6 second.

In the case of a cold start, the viscosity of the hydraulic fluid is relatively high. This results in a very long modulation time and thus in a long clutch slip time. The clutch linings can be damaged due to said long clutch slip time. In this case, the clutch is engaged by a reactivation of the magnetic valve 10 so that the clutch slip time is hereby limited.

If, by a new switching operation, a clutch should be engaged which had already been used prior to the last switching operation, then the clutch cylinders and lines of the clutch are still filled to a great extent for a period of time.

In this case, a quick filling of the clutch cylinders would be unfavorable so that the quick filling phase is eliminated when such switching occurs in the quick filling elimination time t_quick filling elimination. The time t_M6 is then set to zero, by the electronic control system, so that a quick filling is prevented.

If a new switching occurs before resetting of the pressure-control device, according to the invention, the magnetic valve 10 is immediately activated to set back the pressure-control device. This prevents an unmodulated switching and thus an impulse.

However, since additional time is needed to return the displacement piston 4 to its initial position, the magnetic valve 10 remains engaged for a specific time which is designated as Baumann time t_Baumann. The value of this time amounts to approximately 0.1 second.

In addition, during the time t_Baumann the reverse clutches of the vehicle are disengaged to prevent a torque peak on the transmission output of the power train in case the clutch has completely been filled already before expiration of the time t_Baumann.

The function described is active when the new actuation of the clutch occurs, before expiration of the resetting time, whereby the resetting time t_reset control results as a sum of the times t_reactivation and t_Baumann.

| Reference numerals | |
|---|---|
| 1 | pressure line |
| 2 | pressure-control valve |
| 3 | pressure-control piston |
| 4 | displacement piston |
| 5 | compression spring |
| 6 | compression spring |
| 7 | clutch line |
| 8 | line |
| 9 | double pressure stage valve |
| 10 | magnetic valve |
| 11 | first switching valve |
| 12 | line |
| 13 | throttle recoil valve |
| 14 | second switching valve |
| 15 | orifice |
| C2 | chamber behind the displacement piston |

We claim:

1. A pressure-control device for affecting engagement behavior of powershift clutches in a powershift gear, the pressure-control device including a pressure-control valve by which a pressure cycle for engaging a desired powershift clutch can be controlled;

wherein the pressure control valve includes both a pressure control piston and a displacement piston, a first chamber is located between the displacement piston and the pressure-piston; and a magnetic valve, coupled to a source of hydraulic fluid, is connected to both a first switching valve and a second switching valve for supplying hydraulic fluid thereto; the first switching valve controls a flow of hydraulic fluid to and from the first chamber; and the second switching valve controls a flow of hydraulic fluid from the second chamber, spaced from the first chamber by the displacement piston, whereby the pressure-contol piston is maintained in an initial position for supplying a substantially unitrupted flow of hydraulic pressure to a clutch line connected to the desired powershift clutch to be engaged.

2. The pressure-control device according to claim 1, wherein the magnetic valve is always activated in a neutral state and, when a gear is switched, the magnetic valve, after engagement of a new clutch, still remains activated for a specific time, and upon deactivation of the magnetic valve the chamber is exhausted via the second switching valve via a line which is connected by an orifice with the clutch line.

3. The pressure-control device according to claim 1, wherein a throttle recoil valve is located between the magnetic valve and the second switching valve and, upon activation of the magnetic valve, the throttle recoil valve allows hydraulic fluid flow from the magnetic valve to the second switching valve, but when the magnetic valve is inactive, the throttle recoil valve throttles the hydraulic fluid flowing back from the second switching valve to the magnetic valve.

4. The pressure-control device according to claim 1, wherein the magnetic valve is immediately reactivated when, during a current pressure modulation, a new clutch is engaged.

5. The pressure-control device according to claim 1, wherein the magnetic valve is controlled by an electronic control system for the pressure-control device.

6. The pressure-control valve according to claim 1, wherein the time is variably programmed in an array of the electronic control system and the time is variable depending on hydraulic fluid temperature and on clutch speed.

7. The pressure-control device according to claim 1, wherein the specific time is set to zero by the electronic control system.

8. The pressure-control device according to claim 1, wherein the magnetic valve, after expiration of a predetermined period of time from initiation of the switching operation, is again activatable and the pressure-control valve is again controlled to an initial position.

9. The pressure-control device according to claim 1, wherein the pressure control piston and the displacement piston are biased away from one another by a pair of springs.

* * * * *